(12) United States Patent
Graf et al.

(10) Patent No.: US 8,844,867 B2
(45) Date of Patent: Sep. 30, 2014

(54) BAGGAGE COMPARTMENT FOR AN AIRCRAFT AND AIRCRAFT HAVING THE BAGGAGE COMPARTMENT

(71) Applicants: Oleg Graf, Illertissen (DE); Ulrich Evers, Ulm (DE)

(72) Inventors: Oleg Graf, Illertissen (DE); Ulrich Evers, Ulm (DE)

(73) Assignee: Diehl Aircabin GmbH, Laupheim (DE)

( * ) Notice: Subject to any disclaimer, the term of this patent is extended or adjusted under 35 U.S.C. 154(b) by 0 days.

(21) Appl. No.: 13/679,074

(22) Filed: Nov. 16, 2012

(65) Prior Publication Data
US 2013/0119841 A1    May 16, 2013

(30) Foreign Application Priority Data
Nov. 16, 2011   (DE) .......................... 10 2011 118 550

(51) Int. Cl.
*B64D 11/00*   (2006.01)
(52) U.S. Cl.
CPC ..................................... *B64D 11/003* (2013.01)
USPC ....................................................... 244/118.5
(58) Field of Classification Search
USPC .............................. 244/118.1, 118.5; 312/248
See application file for complete search history.

(56) References Cited

U.S. PATENT DOCUMENTS

| | | | | |
|---|---|---|---|---|
| 5,456,529 | A | * | 10/1995 | Cheung .......................... 312/245 |
| 5,743,487 | A | * | 4/1998 | Rice ............................... 244/1 R |
| 6,258,007 | B1 | * | 7/2001 | Kristjansson ...................... 477/7 |
| 7,246,771 | B2 | | 7/2007 | Wisch et al. |
| 7,887,008 | B2 | * | 2/2011 | Lamoree et al. ............ 244/118.1 |
| 8,028,957 | B2 | * | 10/2011 | Wolf et al. .................. 244/118.5 |
| 8,596,577 | B2 | * | 12/2013 | Berkenhoff et al. ........ 244/118.1 |
| 2011/0133029 | A1 | * | 6/2011 | Berkenhoff et al. ........ 244/118.5 |

FOREIGN PATENT DOCUMENTS

| | | |
|---|---|---|
| DE | 10030129 A1 | 1/2002 |
| DE | 10361830 A1 | 8/2005 |
| DE | 10 2009 057 014 A1 | 6/2011 |

OTHER PUBLICATIONS

English Abstract of WO 0199254 A1, dated Dec. 27, 2001 (Corresponding to DE 10030129 A1).

* cited by examiner

*Primary Examiner* — Tien Dinh
*Assistant Examiner* — Michael Kreiner
(74) *Attorney, Agent, or Firm* — Scully, Scott, Murphy & Presser, P.C.

(57) ABSTRACT

A baggage compartment for an aircraft is provided. The compartment has a housing and a baggage holder swivel-mounted in the housing. The baggage holder is moveable from a closed position into an open position with a first swivel movement to open the baggage. The baggage holder is moveable from the open position into the closed position with a second swivel movement to close the baggage. The compartment also has a swiveling device for moving the baggage holder into the open or closed position by performing the first or second swivel movement.

16 Claims, 4 Drawing Sheets

BAGGAGE COMPARTMENT FOR AN AIRCRAFT AND AIRCRAFT HAVING THE BAGGAGE COMPARTMENT

BACKGROUND OF THE INVENTION

The invention relates to a baggage compartment for an aircraft and an aircraft having the baggage compartment.

DISCUSSION OF THE PRIOR ART

Baggage compartments for aircraft, known the world over as "hatracks", are often disposed in the passengers' overhead area. A current variant of the hatrack comprises a housing with a swivel mounted chute integrated therein. To open and stow items of baggage in the hatrack, the chute is swiveled out of the housing. By swiveling the chute back into the housing the hatrack is closed, which means that the items of baggage are safely stowed therein during the flight. Baggage holders which are opened and closed again in a motor-assisted manner are already known in the art.

For example, publication DE 10 2009 057 014 A1, which probably constitutes the closest prior art, discloses a device for closing a lowerable chute of a baggage compartment in an aircraft. The device comprises a winding roller and a deflection roller over which a cable is guided, with which the chute can be automatically closed. The winding roller is driven by an electromechanical hybrid drive, particularly by a gas compression spring and an electric motor. The torque from the electric motor is converted by planetary gears and a bevel drive and transmitted to the winding roller.

The problem addressed by the invention is that of providing a baggage compartment with a simplified, installation-space-saving drive mechanism.

SUMMARY OF THE INVENTION

A baggage compartment is proposed, which is suitable and/or designed for an aircraft, particularly a passenger aircraft. The baggage compartment is preferably capable of being integrated in an aircraft cabin and is particularly designed to be fitted in an overhead area above the rows of passengers. The baggage compartment is preferably designed as an element or as a segment of a hatrack or it forms the hatrack.

The baggage compartment comprises a housing, which preferably exhibits mechanical interfaces for securing the baggage compartment in the aircraft cabin. The housing particularly comprises at least two housing side walls and a housing rear wall, wherein further baggage compartments or end sections of a row of baggage compartments are preferably attached to the two housing side walls. In a preferred embodiment, the baggage compartment, particularly the housing, is in the form of a plastic part, particularly a plastic injection moulding.

The baggage compartment further comprises a baggage holder, which comprises a first and a second holder side wall, a holder base, a front side and a rear side. It is particularly preferable for the baggage holder to be designed as a plastic part, particularly a plastic injection moulding. It is preferable for the baggage holder to be designed as a chute, particularly as a pivot bin. In this function the baggage holder exhibits a receiving opening through which it can be loaded with items of baggage, particularly hand baggage.

The baggage holder is swivel-mounted in the housing. By means of a first swivel movement, the baggage holder can be moved from a closed position into an open position. The baggage compartment is opened by the first swivel movement, wherein the receiving opening of the baggage holder is preferably opened for the stowage of items of baggage therein.

By means of a second swivel movement, the baggage holder is moved from the open position into the closed position, as a result of which the baggage compartment is closed and the pieces of baggage stowed therein. There is preferably no access to the receiving opening in the closed position.

The baggage compartment comprises a swiveling device, which is designed to move the baggage holder into the open or closed position by performing the first or second swivel movement.

The swiveling device comprises a cable winch mechanism having a winding roller and a drive mechanism having a drive motor. The drive mechanism is preferably designed to drive and rotate the cable winch mechanism, particularly the winding roller.

A first and a second winding medium are preferably arranged on the winding roller, particularly rolled up thereon. In particular, one end of the first and second winding medium is connected to the winding roller and another free end to the baggage holder, as a result of which the torque from the drive motor is transferable via the cable winch mechanism to the baggage holder.

Depending on the rotational direction of the winding roller, the first and second winding media are particularly unrolled from or rolled onto said roller. Through the unwinding of the first and second winding media from the winding roller, the baggage holder preferably performs the first swivel movement, as a result of which it is transferred from the closed into the open position and the baggage compartment is opened. When winding the first and second winding media onto the winding roller, the baggage holder preferably performs the second swivel movement, as a result of which it is moved from the open position into the closed position and the baggage compartment is closed.

The drive mechanism preferably drives the winding roller at a constant speed, so that the baggage compartment likewise performs the first or second swivel movement at a constant speed.

The baggage holder preferably comprises a locking mechanism, through which the baggage holder can be locked to the housing when the baggage compartment is closed. The locking mechanism is preferably in the form of an electromechanical lock.

The baggage compartment optionally comprises at least one control mechanism or it is connectable or connected thereto. A user, e.g. a passenger or cabin staff member, can use the control mechanism to operate the baggage holder, particularly to unlock it and trigger performance of the swivel movements. The baggage holder preferably performs the first swivel movement automatically and/or independently upon and/or following actuation of the control mechanism until it adopts the open position and the baggage compartment is completely open. With the first swivel movement it is possible for the baggage holder to be gravity-assisted and at the same time moved into the open position by the cable winch mechanism.

Following repeated use of the control mechanism by the user, the baggage holder is automatically closed again by the drive of the drive mechanism and the winding of the winding media onto the winding roller. Consequently, the user need advantageously use no or only a small amount of force, in order to open or close the baggage compartment. It is advantageous that the baggage compartment is extremely user-friendly in design and the loading of said baggage compartment is more convenient.

According to the invention, the drive motor is designed as an external rotor motor, wherein a rotor shaft is disposed coaxially to the winding roller. The external rotor motor is preferably designed as an electric motor in which the stationary part of the motor (stator) is arranged on the inside and surrounded by a moved component, the rotor shaft. For example, the rotor shaft is formed from at least one annular permanent magnet or from a multi-pole magnetized ring.

It is advantageous that a highly compact, installation-space-saving drive mechanism can be provided through the coaxial configuration of the rotor shaft and the winding roller.

In a preferred embodiment of the invention, the drive motor is in the form of an external rotor torque motor. The external rotor torque motor can be particularly classified among the so-called "slow runners". High acceleration and deceleration values can advantageously be provided by the external rotor torque motor design. In particular, a torque preferably of at least 100 Nm, particularly at least 1000 Nm, especially at least 10000 Nm can be produced.

An external rotor torque motor is advantageously dynamically stable and torsionally rigid in design. Particularly by means of the external rotor torque motor, a position, especially the open and closed position of the baggage holder, can be precisely approached. It is furthermore advantageous that the external rotor torque motor is distinguished by a long service life and freedom from maintenance for the most part, as it only has a small number of expendable parts.

In a preferred embodiment of the invention, the drive mechanism comprises a harmonic drive transmission for the low-speed conversion of the torque from the external rotor motor and for the transmission thereof to the cable winch mechanism, particularly the winding roller.

In a preferred structural embodiment, the harmonic drive transmission has an elliptical steel disc, preferably with a shrunk-on rolling bearing, wherein the steel disc forms a drive shaft of the transmission. The harmonic drive transmission preferably comprises a thin-walled deformable cylindrical steel bushing with a flexspline, which forms a drive shaft of the harmonic drive transmission. The harmonic drive transmission preferably exhibits a rigid cylindrical outer ring with a circular spline, wherein the flexspline of the steel bushing meshes with the circular spline of the outer ring. For functional implementation, the flexspline of the steel bushing has fewer teeth than the circular spline of the outer ring.

When the elliptical steel disc is driven by the external rotor motor, the steel bushing is deformed via the ball bearing, as a result of which the flexspline of the steel bushing meshes with the circular spline of the outer ring in the area of the large elliptical axle. Due to the fact that the outer ring is arranged in a fixed, rotation-free manner, the output shaft lags behind while the drive shaft rotates, particularly in accordance with the smaller number of teeth compared with the outer ring. The harmonic drive transmission therefore preferably offers high transmissions, e.g. roughly 160:1, wherein 160 revolutions of the rotor shaft are transmitted into one revolution of the output shaft of the harmonic drive transmission.

As also applies to the external rotor torque motor, the harmonic drive transmission advantageously exhibits a compact design, which means that a small amount of space is required for its integration in the baggage compartment and installation space can be saved. This is particularly advantageous in a cramped aircraft cabin. Further advantages are offered by a largely maintenance-free design, high rigidity and a backlash-free output from the harmonic drive transmission, through which the baggage holder can be moved with positional accuracy into the open or closed position.

In a preferred structural embodiment of the invention, the swiveling device comprises a first and a second frame element, wherein the first frame element is optionally secured to the rear wall of the housing and the second frame element optionally in addition to a carrier structure of the aircraft, particularly to the cabin wall or ceiling.

The drive device and the cable winch mechanism are preferably disposed between the frame elements, wherein the two frame elements are connected to one another by at least one axle. The winding disc, rotor shaft and output shaft are preferably disposed coaxially to one another, wherein the winding disc, the rotor shaft and the output shaft are rotatably mounted on the axle.

The output shaft is preferably directed at the winding roller when the drive motor is in the installation position and arranged adjacent thereto. The output shaft is particularly disposed between the rotor shaft and the winding roller. The stator is preferably connected to the second frame element. Alternatively, it is also possible for the rotor shaft to be arranged right alongside the winding roller and for the output shaft to be connected to the second frame element, so that the drive motor rotates with the winding roller and the drive shaft is disposed in a fixed manner. It is particularly preferable for the winding roller to have a smaller diameter than the rotor shaft and/or than the output shaft. This particularly supports the transmission of the torque from the drive motor to the winding roller.

In a possible embodiment of the invention, the cable winch mechanism comprises at least one deflection roller, particularly a first and a second deflection roller. The first winding medium is preferably guided via the first deflection roller and deflected in a first guide direction. The second winding medium is optionally guided via the second deflection roller and deflected from this in a second guide direction. The first and second guide directions preferably run counter to one another.

In particular, the first winding medium is guided in the first guide direction to the first holder side wall and the second winding medium in the second guide direction to the second holder side wall. The free ends of the winding media are preferably secured to the corresponding holder side walls. The baggage holder is therefore guided on both sides and can thereby be reliably swiveled into the open or closed position when the winding roller is driven.

In a preferred embodiment of the invention, the first and second winding media are in the form of a steel strap. Alternatively, the first and second steel strap may be in the form of a synthetic strap. The winding media particularly exhibit a rectangular cross section with a very low height. In particular, the winding media are flat in design, exhibiting a height of no more than 1.5 mm, preferably no more than 1 mm, particularly no more than 0.5 mm.

It is advantageous that the winding media have a comparatively small bending radius in the steel or synthetic strap design. In addition, due to their flat design and low height, the winding media exhibit a comparatively low overall height, when they are laid on top of one another in the completely rolled-up state. Consequently, the winding roller can be kept relatively small in terms of its diameter, particularly smaller than the diameter of the rotor shaft and/or of the output shaft. This has a particularly beneficial effect on the installation space required for integration in the baggage compartment.

In a particularly preferred embodiment of the invention, the baggage compartment, particularly the swiveling device, has at least one energy storage mechanism. The energy storage mechanism preferably works electrically, e.g. is designed as at least one capacitor. It is particularly preferable for the energy storage mechanism to be designed as a sequence of a plurality of capacitors. When connected to a power source, the capacitor stores electric charge, which is preferably released again as electrical energy to support the second swivel movement of the baggage holder.

It is advantageous that through the energy release of the energy storage mechanism, the energy or power consumption of the external rotor motor required to close the baggage compartment can be reduced.

In a preferred embodiment of the invention, the baggage compartment, particularly the swivel mechanism, comprises a control mechanism. Alternatively, the baggage compartment is connectable or connected to the control mechanism. The control mechanism is preferably designed as a Programmable Logic Controller (PLC). Optionally, the control mechanism comprises an evaluation mechanism for evaluating incoming electrical signals. For example, the control mechanism is integrated locally on the baggage compartment, particularly on or between the frame elements of the swiveling device, or centrally in an aircraft control system.

In a further possible embodiment of the invention, the baggage compartment, particularly the drive mechanism, comprises a measuring device for measuring the electrical motor current. The measuring device is preferably in the form of a Hall-effect sensor. The motor current measured by the measuring device is conveyed to the evaluation mechanism by the electric signals, said evaluation mechanism evaluating said signals. In particular, the evaluation mechanism calculates a loading weight for the baggage holder using the motor current and transmits this to the control mechanism. In particular, the motor current may be readjusted by the control mechanism depending on the calculated loading weight.

In a further possible embodiment of the invention, the control mechanism triggers the energy storage mechanism depending on the loading weight determined for the baggage holder. At a loading weight smaller than a first limit loading weight of 25 kg, for example, the energy storage mechanism is preferably not connected, in which case the drive motor exclusively takes over the drive of the baggage holder.

At a loading weight in excess of the first limit loading weight, e.g. over 25 kg, the control mechanism triggers the connection of the energy storage mechanism, in order to support the drive motor with the baggage holder drive. The energy storage mechanism therefore supports the drive mechanism in a software-controlled manner, particularly depending on the loading weight. In particular, the drive motor must transmit less force to the baggage holder during the second swivel movement due to the connection of the energy storage mechanism, as a result of which it can be advantageously operated in an energy-saving manner.

Furthermore, if there is uneven loading among a plurality of baggage compartments, it can also be guaranteed that all baggage compartments can be opened or closed at the same constant speed. In particular, a sharply varying loading weight in the baggage compartments has no effect on the swivel movements of the baggage holder.

If, however, a loading weight greater than a second limit loading weight of e.g. 50 kg is determined, the baggage holder is overloaded. In this case, the control mechanism preferably stops the drive motor, so that the baggage holder remains open until the maximum permitted loading weight is no longer exceeded. Overloading can therefore be prevented and hot-running or overloading of the drive motor prevented.

When the overloading is corrected by removing items of baggage from the baggage holder, the control mechanism triggers the drive motor again and, as an optional addition, the energy storage mechanism, in order to close the baggage compartment.

By determining the loading weight with the help of the electric motor current, items of baggage that have been left in the aircraft's baggage compartments can also be advantageously detected.

In a preferred embodiment of the invention, the drive mechanism comprises a rotary encoder which is designed to detect an angle of rotation of the rotor shaft. The measured angle of rotation of the rotor shaft is preferably transmitted to the evaluation mechanism, which uses this to calculate an opening angle for the baggage holder and transmits this to the control mechanism. Depending on the opening angle, said control mechanism triggers the drive motor to drive the baggage holder during the first or second swivel movement until said baggage holder adopts the open position or the closed position.

The rotary encoder may be optionally designed as an absolute encoder or preferably as an incremental encoder. With the incremental encoder design, very precise positional values can be determined for the baggage holder, due to the advantageously high speed of the drive motor and due to the transmission ratio. It is thereby guaranteed that the baggage holder can be moved into the open position or closed position with positional accuracy. As an optional addition, the locking mechanism reports the complete locking of the baggage compartment to the control mechanism.

In a possible structural embodiment of the invention, the baggage compartment has anti-trap protection, which is advantageously disposed on the closing edges of the housing and/or of the baggage holder. The anti-trap protection preferably detects whether there are any obstacles between the closing edges when the baggage holder is closing. If an obstacle is detected, a signal is sent to the control mechanism, which then stops the second swivel movement of the baggage holder until the obstacle has been removed and is no longer detected by the anti-trap protection. In particular, the closing operation only continues once the obstacle has been removed and after the all-clear has been given by the anti-trap protection to the control mechanism. Any risk of injury, e.g. risk of fingers being crushed, is therefore minimized for users through the integration of the anti-trap protection.

The control mechanism of the baggage compartment is preferably arranged as a switch or push-button on the front of the baggage holder. For example, the user may unlock the baggage compartment by activating the control mechanism and thereby initiate the first swivel movement. Where necessary, e.g. during a power cut or mechanical system failure, the baggage compartment may also be unlocked and/or opened manually.

The second swivel movement is preferably initiated by a fresh actuation of the control mechanism and the baggage compartment is closed again and locked. The second swivel movement may, alternatively, also be triggered as a manual lifting of the baggage holder. In this case, the control mechanism triggers the drive motor when the baggage holder has not been in the open position over a defined period of time and the drive motor has not yet been activated.

Alternatively or as an optional addition, the control mechanism may be in the form of a remote control with which the cabin staff, for example, can control a plurality of or all baggage compartments within the aircraft centrally. This may be advantageous, e.g. when the aircraft is taking off and/or landing. It is also possible that the cabin staff is able to activate the baggage compartments in the aircraft singly or individually.

In a possible embodiment of the invention, the baggage compartment can be connected to a display device. Operating states, such as, for example, the open or closed position of the baggage compartment(s) on the aircraft, are preferably displayed by the display device. It is also particularly preferable for error messages, e.g. baggage holder overload, failure of mechanical and/or electrical components, faulty operation, misuse by users, etc. to be displayed on the display device. The display on the display device is particularly controlled by the control mechanism.

It is preferable for the display device to be arranged within the area of responsibility of the cabin staff, so that it can convey necessary information to them visually. It is also possible for the display device to be attached to the baggage compartment centrally, in order to inform users individually.

The display device is optionally in the form of an information panel with a plurality of multi-coloured light-emitting diodes (LEDs). Alternatively, the display device may be in the form of a screen or display, particularly a liquid-crystal display.

BRIEF DESCRIPTION OF THE DRAWINGS

Further features, advantages and effects of the invention emerge from the following description of preferred exemplary embodiments of the invention. In these.

Identical parts or parts which correspond to one another are each provided with the same reference number in the figures.

DETAILED DESCRIPTION OF THE INVENTION

Figure 1:
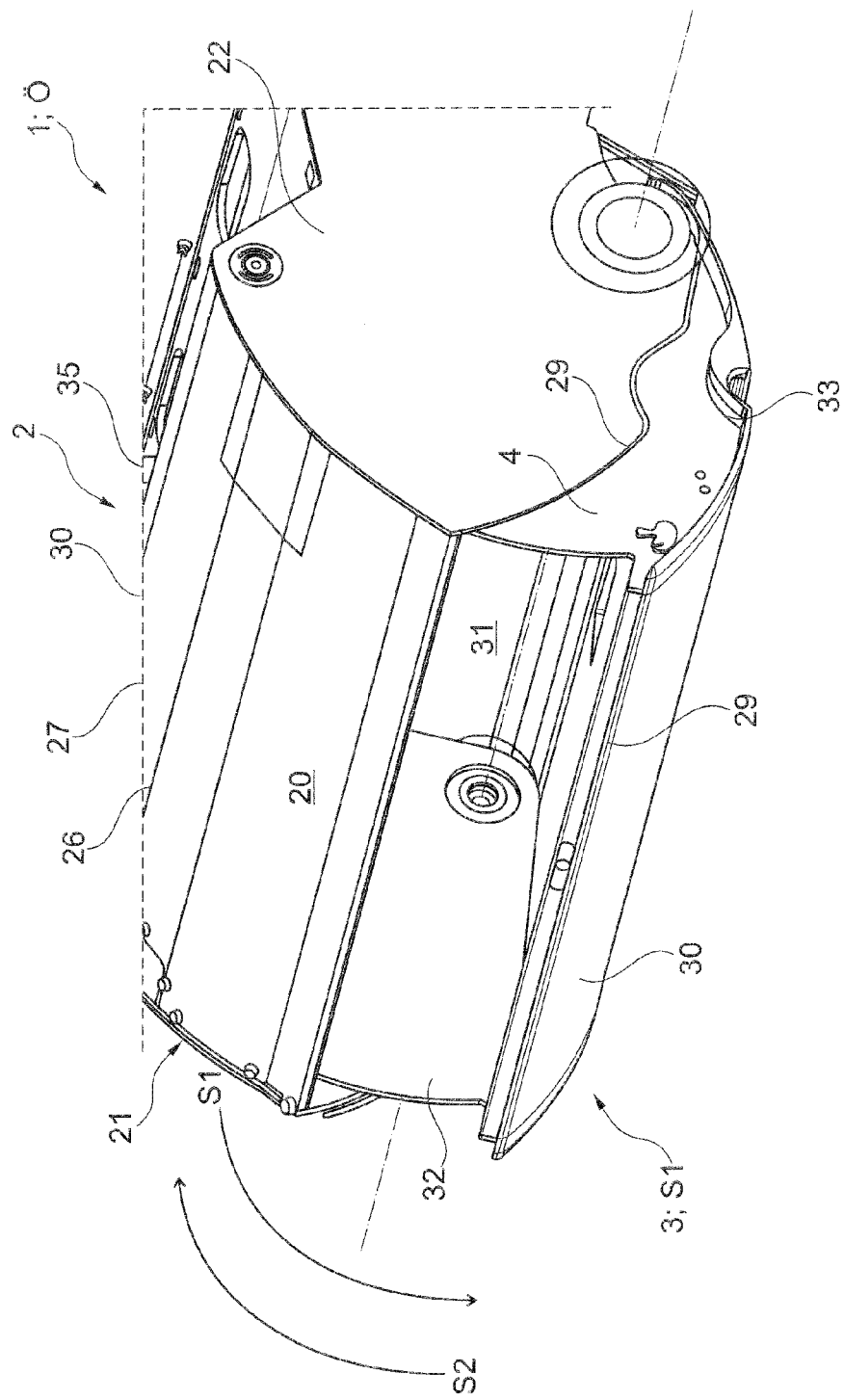
FIG. 1 shows a baggage compartment for a side row of seats in an aircraft.

FIG. 1 shows a perspective side view of a baggage compartment 1 as an exemplary embodiment of the invention. The baggage compartment 1 is suitable and/or designed for integration in an aircraft, particularly a passenger aircraft. The baggage compartment shown may be integrated in an overhead area of passengers sitting in a side row of seats in the aircraft, for example. It is in the form of a hatrack or part of a hatrack.

The baggage compartment 1 has a housing 2 and a baggage holder 3 arranged therein. The housing 2 comprises a housing upper side 20 and two housing side walls 21, 22. It is securable or secured in an immovable fashion to an aircraft wall.

The baggage holder 3 is in the form of a chute or a pivot bin and is disposed between the housing side walls 21; 22 in the housing 2. The baggage holder 3 comprises a front side 30, a rear side 31 and a first and second holder side wall 32; 33, which together enclose a receiving opening for items of baggage.

The holder side walls 32; 33 are arranged adjacent to the housing side walls 21; 22 and run parallel or virtually parallel thereto.

The baggage holder 3 is swivel-mounted in the housing 2. By means of a first swivel movement S1, the baggage holder 3 is swiveled out of the housing 2 and adopts an open position Ö, as a result of which the baggage compartment 1 is opened. In the open position Ö the receiving opening is opened for stowage by an aircraft passenger. FIG. 1 shows the open baggage compartment 1 with the baggage holder 3 in the open position Ö.

By means of a second swivel movement S2, which runs counter to first swivel movement S1, the baggage holder 3 is swiveled back into a closed position G which is not shown and the baggage compartment 1 is closed. In the closed position G the receiving opening of the housing upper side 20 is covered and is not visible and/or accessible to the passenger.

The baggage compartment 3 exhibits a locking mechanism 4, with which the baggage holder 3 can be locked in the housing 2. In the locked position, the baggage compartment 3 cannot be manually opened and the baggage holder 3 cannot be swiveled out of the housing 2. The locking mechanism 4 is in the form of an electromechanical lock.

The baggage compartment 1 comprises a control mechanism 35, which is arranged as a push-button or a switch, e.g. on the front side of the holder 30. When the control mechanism 35 is manually actuated by the passenger, the locking mechanism 4 is unlocked, so that the baggage compartment 3 can be opened.

Alternatively or as an optional addition, the control mechanism 35 may be in the form of a remote control with which the locking mechanism 4 can be locked or unlocked from a distance. In this case it is possible, for example, for an aircraft crew or cabin staff to be able to lock or unlock all baggage compartments arranged in the aircraft simultaneously and thereby control these centrally. Likewise, each individual baggage compartment 1 can be individually actuated.

The baggage compartment 1 comprises anti-trap protection 29, which extends along a closing edge of the housing 2 and/or of the baggage holder 3. The anti-trap protection 29 is designed as a sensor mechanism to detect an obstacle between a closing edge of the baggage holder 3 and the closing edge of the housing 2, e.g. due to passengers trapping their fingers.

Furthermore, the baggage compartment 1 comprises a control mechanism 26, e.g. a Programmable Logic Controller (PLC), with an evaluating mechanism which is not shown for evaluating incoming electrical signals. The baggage compartment 1 may also be connected or connectable to the control mechanism 26. The control mechanism 26 is disposed on the housing 2 of the baggage compartment 1 or connected thereto. Alternatively, the control mechanism 26 may also be disposed centrally in the aircraft control system.

Figure 2:
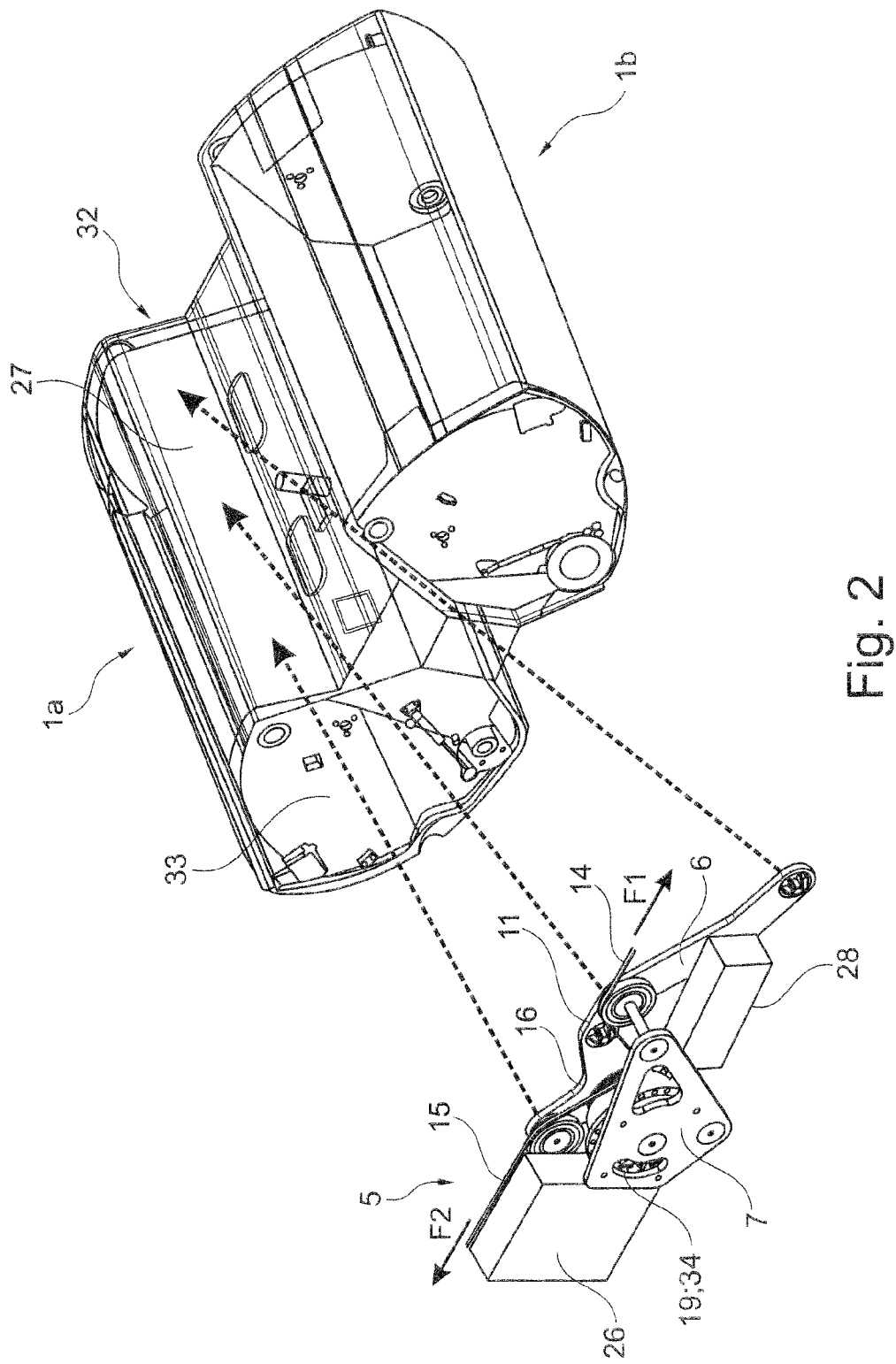
FIG. 2 shows two baggage compartments for a centre row of seats in the aircraft from FIG. 1.

FIG. 2 shows two of the baggage compartments 1a; 1b as they are arranged over the middle row of seats in an aircraft cabin, for example. The two baggage compartments 1a; 1b are arranged such that their rear housing walls 27 are directed towards one another.

The baggage compartment 1a comprises a swiveling device 5 for swiveling the baggage holder 3 and for the automatic and independent movement of the baggage holder into the open and closed position Ö; G. It is preferable for all baggage compartments 1a; 1b disposed in the aircraft to exhibit the swiveling device 5.

Three dotted-line arrows pointing from the swivel mechanism 5 to the baggage compartment 1a are used to illustrate the preferred fixing points between the swiveling device 5 and the rear housing wall 27 of the baggage compartment 1a. In particular, the swivel mechanism 5 is arranged on the rear housing wall 27 in the installation position, particularly screwed thereto.

Figure 3:
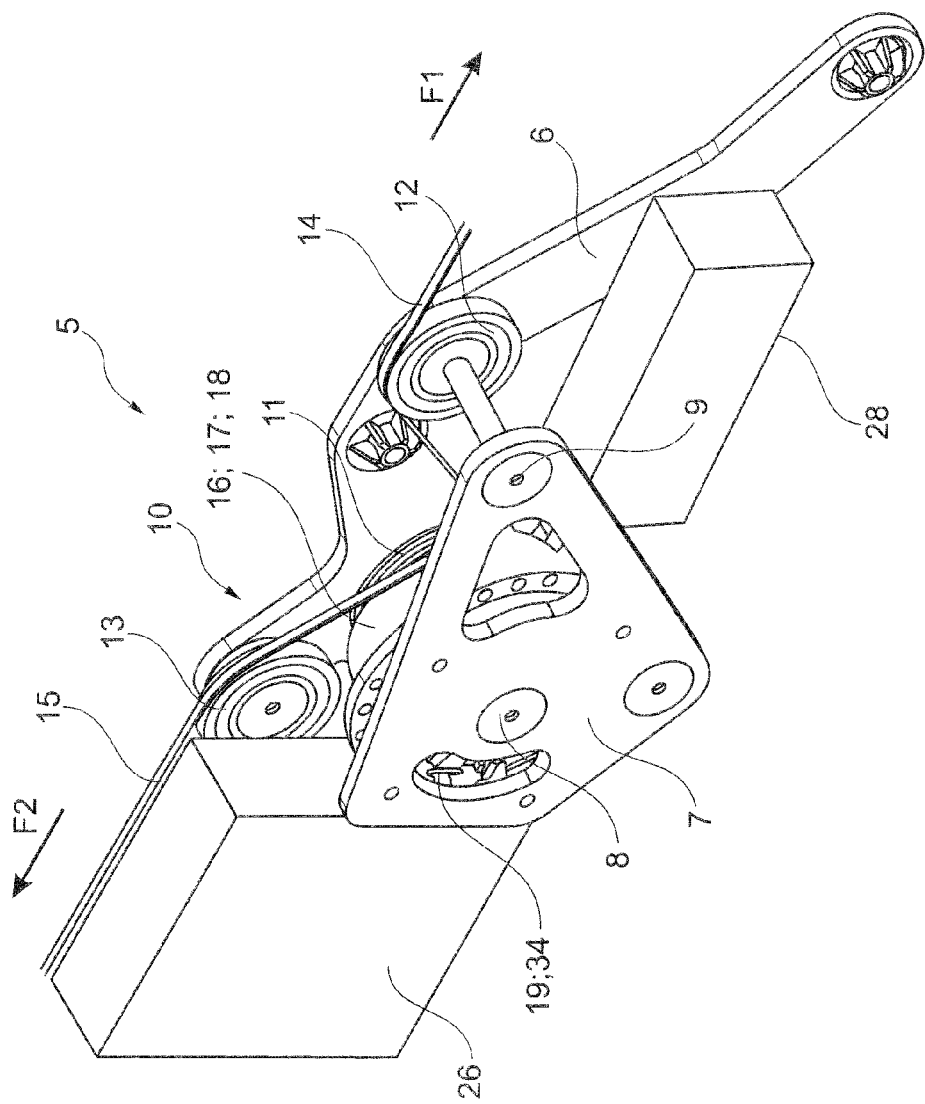
FIG. 3 shows a swiveling device of the baggage compartment from FIG. 1 or 2.

The swivel mechanism 5 is shown in an enlarged view in FIG. 3. It comprises a first and a second frame element 6; 7, which are connected to one another via a first and second axle 8; 9. As illustrated in FIG. 2, the swivel mechanism 5 can be secured to the rear housing wall 27 via the first frame element 6. Alternatively or as an optional addition, the swiveling device 5 may be secured via the second frame element 7 to a carrier structure of the aircraft, e.g. to a cabin wall or ceiling.

The swiveling device 5 comprises a cable winch mechanism 10 having a winding roller 11 and a first and second deflection roller 12; 13. The winding roller 11 is swivel-mounted on the first axle 8 adjacent to the first frame element 6. The first deflection roller 12 is rotatably mounted on the second axle 9. The second deflection roller 13 is also secured to the first frame element at the same height and rotatably mounted thereon.

The cable winch mechanism 10 comprises a first and a second winding medium 14; 15 which are disposed and rolled up on the winding roller 11. The winding media 14; 15 are in the form of a flat steel strap with a maximum height of 1.5 mm, preferably lower, and are secured at one end to the winding roller 11.

The first winding medium 14 is guided and deflected via the first deflection roller 12 in a first guide direction F1, whereas the second winding medium 15 is guided and deflected via the second deflection roller 13 in a second guide direction F2. The first and second guide directions F1; F2 run counter to one another. In the installation position according to FIG. 2, the first guide direction F1 is aimed at the first holder side wall 32 and the second guide direction F2 at the second holder side wall 33. In this case, a free end of the first winding medium 14 is connected to the first holder side wall 32 and a free end of the second winding medium 15 is connected to the second holder side wall 33 in a positive-locking and/or non-positive-locking manner.

According to FIG. 3, the swiveling device 5 comprises a drive mechanism 16 having a drive motor 17 and a transmission 18 for driving the winding roller 11 and for swiveling the baggage holder 3. The drive mechanism 16 is disposed between the second frame element 7 and the winding roller 11. In this case, a drive shaft 37 of the transmission 18 is adjacent to the winding roller 11, particularly between the winding roller 11 and the rotor shaft 23. The winding roller 11 has a smaller diameter than the rotor shaft 23 of the drive motor 17 (see also FIG. 4 in this respect).

In the structural embodiment according to FIG. 3, the swiveling device 5 comprises the control mechanism 26. Furthermore, the swiveling device 5 has an energy storage mechanism 28, which is designed to support the second swivel movement S2 of the baggage holder 3 and to relieve the drive motor 17 when the baggage holder 3 is driven during the second swivel movement S2.

The energy storage mechanism 28 is in the form of at least one capacitor, which stores electric charge when connected to a power supply and delivers it again as electrical energy during the second swivel movement S2. The power consumption of the drive motor 17 can thereby be reduced, particularly when there is a heavy load in the baggage holder.

Figure 4:
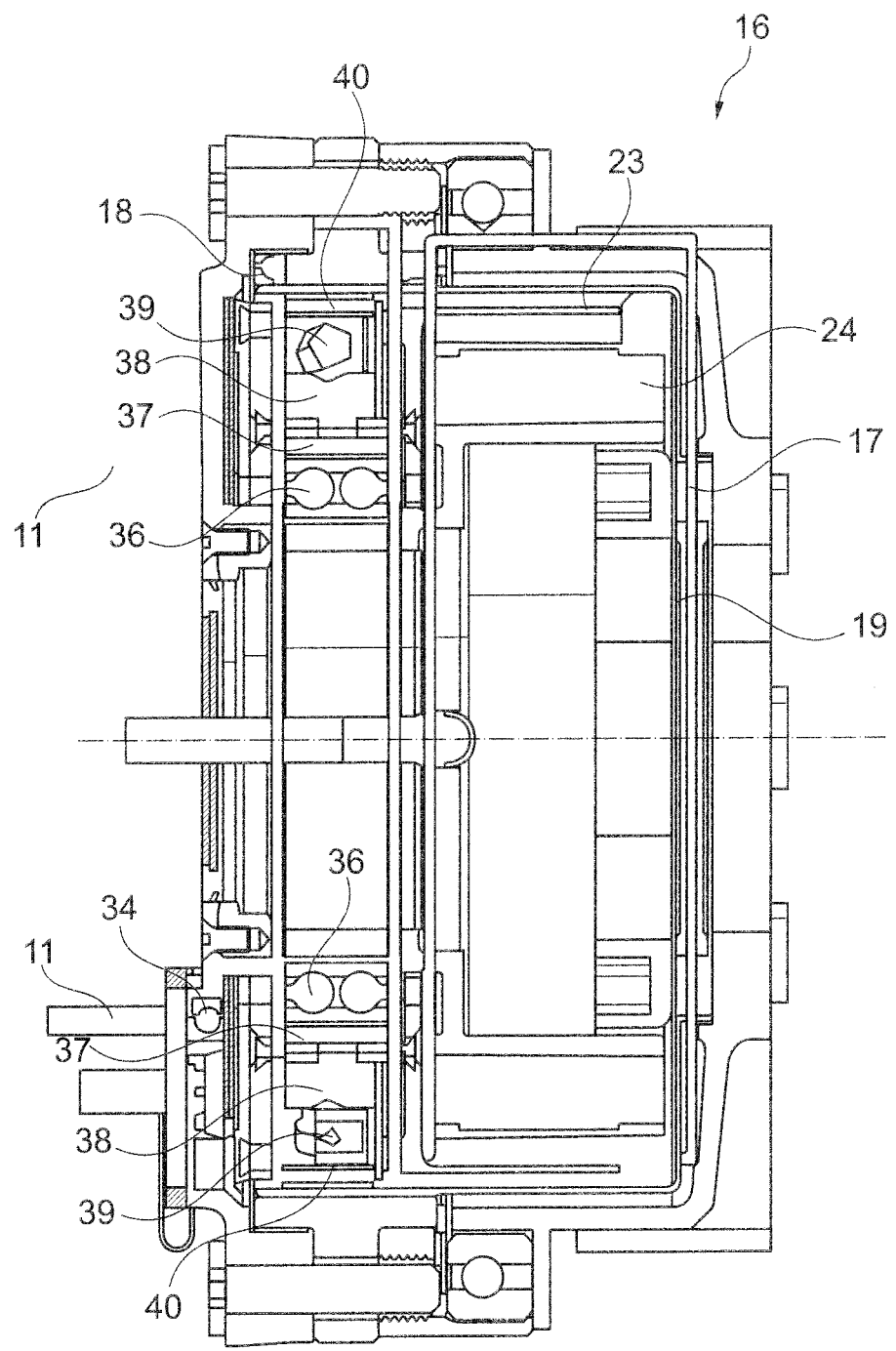
FIG. 4 shows a drive device of the swiveling device from FIG. 3.

The drive mechanism 16 is shown more accurately in cross section in FIG. 4. This shows the drive motor 17 and the transmission 18. The drive motor 17 takes the form of an external rotor torque motor, in which a rotor shaft 23 is arranged externally and a stator 24 internally. The rotor shaft 23 is formed on a multi-pole magnetized ring coaxially to the winding roller 11 (FIG. 3). This enables the swivel mechanism 5 to have a compact design, which is advantageous, particularly for integration in spatially cramped aircraft cabins.

The transmission 18 is in the form of a harmonic drive transmission. The harmonic drive transmission comprises an elliptical steel disc mounted on a rolling bearing 36 as the drive shaft 37 and a thin-walled, deformable cylindrical steel bushing (flexspline) as the output shaft 38. The output shaft 38 has a flexspline 39.

The harmonic drive transmission comprises a rigid, rotation-free cylindrical outer ring 40 having a circular spline, wherein the outer ring 40 has more teeth than the output shaft 38. The output shaft 38 is deformed via the rolling bearing 36, as a result of which the flexspline 39 of the output shaft 38 engages with the circular spline of the outer ring 40 and meshes therewith when the drive shaft 37 is driven. The different number of teeth means that the output shaft 38 lags behind in line with the difference in teeth compared with a rotation of the drive shaft 37.

The harmonic drive transmission is therefore designed to convert a drive motor 17 speed in a ratio of approximately 160:1. In particular, 160 revolutions of the rotor shaft 23 are translated into one revolution of the output shaft 38 and of the winding roller 11. The rotational movement of the output shaft 38 is transmitted to the baggage holder 3 via the cable winch mechanism 10, as a result of which said baggage holder performs the first or second swivel movement S1; S2 (FIG. 1).

The drive mechanism 16 comprises a measuring device 19 in the form of a Hall-effect sensor for detecting the electrical motor current of the drive motor 17. The measuring results are transmitted by signals to the evaluation mechanism for evaluation. The evaluation mechanism infers a loading weight of the baggage items in the baggage holder 3 from the level of the motor current (FIGS. 1; 2). The control mechanism 26 controls the speed of the drive motor 17 using the data acquired on the loading weight, so that the baggage compartment 1 is closed at a constant speed, even when there is a heavy load.

Depending on the calculated loading weight, the control mechanism 26 triggers the connection of the energy storage mechanism 28, which then releases its energy, particularly during the second swivel movement S2 of the baggage holder 3, supports the second swivel movement S2 and thereby relieves the load on the drive motor 17 (FIGS. 1-3).

For example, the energy storage mechanism 28 is connected when a loading weight>25 kg is calculated, while the driving power for performing the second closing movement S2 in particular, with a loading weight<25 kg is applied solely by the drive motor 17.

The maximum loading weight of the baggage holder 3 is reached with a loading weight of 50 kg. If it is established that the maximum loading weight has been exceeded, the control mechanism 26 triggers the issuing of an error message, e.g. to the display mechanism 30. As an optional addition, the control mechanism 26 stops the baggage holder 3 being driven by the drive motor 17 and possibly also the optionally connected energy storage mechanism 28.

The drive device 16 comprises a rotary encoder 34, which is in the form of an incremental encoder, for example, designed to detect an angle of rotation of a rotor shaft 23 of the drive motor 17. The measured angle of rotation is transmitted to the evaluation mechanism for evaluation, as a result of which an opening or closing angle of the baggage holder 3 (FIGS. 1; 2) is calculated.

Depending on the opening or closing angle calculated, the control mechanism 26 controls the drive device 16 driving the baggage holder 3, until said baggage holder has reached the open or closed position Ö; G with positional accuracy. The locking mechanism 4, which transmits an electrical signal to the control mechanism 12 indicating that the baggage holder 1 is completely closed (FIGS. 1; 2) serves as the end limit stop in the closed position G.

When the anti-trap protection 29 detects an obstacle when closing, e.g. a passenger's hand between the closing edges of the baggage compartment 1, it communicates this to the control mechanism 11 via a corresponding signal. When the signal is received, said control mechanism stops the second swivel movement S2 of the baggage holder 3 by deactivating the drive device 16 and, as an optional addition, the energy storage mechanism 28. A risk of injury to passengers can thereby be reduced. As soon as the obstacle has been removed or eliminated, the control mechanism 26 restarts the drive device 16, as a result of which the second swivel movement S2 is continued and the baggage compartment 1 is closed (FIGS. 1; 2).

A plurality of error sources which take effect during abnormal operation of the baggage compartment 1 are taken into account in the programming of the control mechanism 26. Possible abnormal processes include, for example, failure of electronic/mechanical components, incorrect operation/misuse by users, trapping of objects, etc.

Error sources of this kind, but also different operating states and/or warning indicators of the baggage compartment 1 can be displayed on a display mechanism 30 connectable or connected to the baggage compartment 1. The display mechanism 30 is disposed within the area of responsibility of the cabin staff and/or right on the baggage compartment 1, for example, so that the user of the baggage compartment 1 can be informed of the operating status.

REFERENCE NUMBER LIST

1 Baggage compartment
2 Housing
3 Baggage holder
4 Locking mechanism
5 Swiveling device
6 First frame element
7 Second frame element
8 First axle
9 Second axle
10 Cable winch mechanism
11 Winding roller
12 First deflection roller
13 Second deflection roller
14 First winding medium
15 Second winding medium
16 Drive mechanism
17 Drive motor
18 Transmission
19 Measuring device
20 Housing upper side
21 First housing side wall
22 Second housing side wall
23 Rotor shaft (rotor)
24 Stator
25 Output shaft
26 Control mechanism
27 Housing rear wall
28 Energy storage mechanism
29 Anti-trap protection
30 Display device
32 First holder side wall
33 Second holder side wall
34 Rotary encoder
35 Control mechanism
36 Rolling bearing
37 Drive shaft
38 Output shaft
39 Flexspline
40 Outer ring

What is claimed is:

1. A baggage compartment for an aircraft, comprising:
    a housing and a baggage holder swivel-mounted in the housing, wherein the baggage holder is moveable from a closed position into an open position with a first swivel movement to open the baggage compartment and wherein the baggage holder is moveable from the open position into the closed position with a second swivel movement to close the baggage compartment,
    a swiveling device configured to move the baggage holder into the open or closed position by performing the first or second swivel movement,
    wherein the swiveling device comprises a cable winch mechanism having a winding roller and a drive mechanism for driving the winding roller, wherein the drive mechanism comprises an external drive motor and a drive transmission,
    wherein the external drive motor comprises a rotor shaft disposed coaxially to the winding roller,
    wherein the drive transmission comprises a drive shaft disposed between the winding roller and the rotor shaft, and the diameter of the winding roller is smaller than the diameter of the rotor shaft.

2. The baggage compartment according to claim 1, wherein the external rotor motor comprises an external rotor torque motor.

3. The baggage compartment according to claim 1, wherein the drive transmission comprises a harmonic drive transmission configured to convert the torque from the external rotor motor and transmit the torque to the winding roller.

4. The baggage compartment according to claim 1, wherein the cable winch mechanism comprises a first deflection roller and a second deflection roller, wherein a first winding medium is guided via the first deflection roller in a first guide direction and a second winding medium is guided via the second deflection roller in a second guide direction, wherein the first and second guide directions run counter to one another.

5. The baggage compartment according to claim 4, wherein a free end of the first winding medium is connected to a first holder side wall and a free end of the second winding medium is connected to a second holder side wall.

6. The baggage compartment according to claim 4, wherein the first and second winding medium comprise a steel strap.

7. The baggage compartment according claim 1, further comprising at least one energy storage mechanism, which is configured to store electrical energy supplied by a power source and to release the electrical energy again during the second swivel movement of the baggage holder, so that the power of the drive motor required to close the baggage compartment is reduced.

8. The baggage compartment according to claim 7, wherein the energy storage mechanism comprises at least one capacitor.

9. The baggage compartment according to claim 7, further comprising a control mechanism.

10. The baggage compartment according to claim 9, wherein said control mechanisms comprises a Programmable Logic Controller (PLC).

11. The baggage compartment according to claim 9, wherein the drive mechanism comprises at least one measuring device for detecting an electric motor current, wherein the control mechanism comprises an evaluation mechanism for calculating a loading weight for the baggage holder using the electrical motor current.

12. The baggage compartment according to claim 11, wherein said at least one measuring device comprises a Hall-effect sensor.

13. The baggage compartment according to claim 11, wherein the drive mechanism comprises a rotary encoder configured to detect an angle of rotation of the rotor shaft,
   wherein the evaluation mechanism calculates an opening or closing angle for the baggage holder using the angle of rotation, and
   wherein the control mechanism triggers the drive mechanism, depending on the opening or closing angle, to drive the baggage holder during the first or second swivel movement until said baggage holder adopts the open position or the closed position with positional accuracy.

14. The baggage compartment according to claim 9, wherein the control mechanism triggers the energy storage mechanism, depending on a loading weight determined for the baggage holder, to release the stored energy during the second swivel movement of the baggage holder, thereby supporting the second swivel movement.

15. The baggage compartment according to claim 1, further comprising at least one control mechanism to activate the baggage holder or connectable or connected to the bagger holder.

16. An aircraft having the baggage compartment according claim 1.

* * * * *